United States Patent [19]

MacDonald

[11] 4,155,193

[45] May 22, 1979

[54] AUTOMATIC ALL-PURPOSE TRAP FOR CATCHING SMALL ANIMALS ALIVE

[76] Inventor: Wallace J. MacDonald, 91 Old Petty Harbour Rd., St. John's, Newfoundland, Canada, A1G 1H6

[21] Appl. No.: 858,275

[22] Filed: Dec. 7, 1977

[30] Foreign Application Priority Data

Feb. 22, 1977 [CA] Canada .................................. 272302

[51] Int. Cl.² .......................................... A01M 23/10
[52] U.S. Cl. ............................................ 43/67; 43/71
[58] Field of Search ..................................... 43/67, 71

[56] References Cited

U.S. PATENT DOCUMENTS

| 1,578,196 | 3/1926 | Hills | 43/67 |
| 2,250,823 | 7/1941 | Conners | 43/71 |

*Primary Examiner*—Robert C. Watson
*Attorney, Agent, or Firm*—Lewis H. Eslinger

[57] ABSTRACT

An automatic trap comprising an outer cage and a drum-shaped inner cage rotatably disposed about an axle within the outer cage. The outer cage has an outer opening which is, in the operative position of the trap, aligned with an inner opening formed in the inner cage to permit entry of a small animal into the inner cage. Within the inner cage there is pivotally and non-rotatably disposed a treadle means on the axle. The treadle means engages at its lower, free end a slot in a smooth side wall of the inner cage, thereby locking the inner cage in place when the trap is in its operative position. The treadle means is then actuated when the animal entering the inner cage contacts the treadle means, thereby releasing it and causing the inner cage to rotate relative to the outer cage by movement of the animal. The inner cage is then locked by a locking means disposed in the outer cage which locks the inner cage in a position in which the outer and inner openings are no longer aligned. The animal, seeking to escape, then moves out from the inner cage through the inner opening into the outer cage. The locking means is then released from engagement with the inner cage when the animal depresses a treadle portion of the locking means. The inner cage is then caused to rotate back to its operative position by means of a counterweight provided with the inner cage at a point opposite the inner opening, and the inner cage is thereafter locked in its operative position by the treadle means. The automatic trap is particularly useful in catching small animals such as mice and rats alive and unharmed, one by one. It is simple in construction and operation, and suitable for economical large-scale manufacture. The trap can be used, without the counterweight and the treadle portion of the locking means, for catching a single small animal.

21 Claims, 5 Drawing Figures

AUTOMATIC ALL-PURPOSE TRAP FOR CATCHING SMALL ANIMALS ALIVE

The present invention relates to an automatic trap adapted to catch small animals alive and unharmed.

There have been proposed and employed a number of different animal traps. There are known and extensively used animal traps employing spring-actuated jaws. There are also known "live" animal traps employing a triggered door. Canadian Pat. No. 80,777, issued May 5, 1903 to Allen W. Phillips, discloses a trap for catching small animals such as mice alive, comprising a wire mesh cage, one end of which constitutes a hinged door. Pivotally mounted in the cage is a trigger rod on one end of which a piece of bait is placed. An animal coming through the door to get the bait, by pulling on the bait, causes the trigger rod to detach, thereby closing the door. Canadian Pat. No. 404,588, issued May 5, 1942 to Smatana et al., also discloses an animal trap of the cage type for catching animals alive and unharmed. The trap comprises an outer annular cage of wire netting, and an inner wire cage concentrically disposed with relation to the outer cage. The inner cage is a bait cage, within which bait is placed. There is a wire cover over the outer and inner cages. An animal, attracted by the bait, enters the outer cage through a door held open by a spring catch which is released by means of slight pressure against the door from behind.

U.S. Pat. No. 407,887, issued July 30, 1889 to Henry Berry, discloses an animal trap of a cage type, in which there is a single entrance or opening at one side of the cage, and a blind rectangular passageway. An animal, attracted by bait placed within the cage, enters through the opening, and activates the mechanism which causes a spring-actuated revolving door to revolve so that a blind portion of the door closes the entrance opening. The animal cannot then escape through the opening, and when it proceeds through the passageway it falls through a trap-door into the main body of the cage. This action triggers a mechanism which causes the outer door to revolve until an opening therein is in register with the opening of the cage, so that the cage is ready to receive another animal.

Many animal traps employing a spring-actuated jaw are certainly effective in catching animals, usually by an extremity such as a leg of the animal, but then often severely injure the animal in the process; and in fact, may kill animals caught by spring-actuated jaws if the jaws hold the animals too firmly or if animals are left unreleased from the jaws for a long period of time. Therefore, this type of trap is unsuitable for catching small animals alive and unharmed for pets or live specimens. This type of animal trap is moreover generally quite noisy, so that fellow animals are likely to be alerted or scared off. Animal traps employing spring-actuated jaws have to be manually reset if it is desired to catch more than one animal. These traps also have another drawback in that people who set the traps may be hurt by unexpected release of the trap jaws.

Another type of animal traps of the "live" type, namely those employing a triggered door, may be able to overcome to some extent some of the drawbacks which accompany the use of animal traps having spring-actuated jaws. However, there still remains the potential danger of trapping an animal between the triggered door and the cage. Furthermore, such a trap may be undesirably noisy when the door is triggered. Once the door is triggered, the trap is unable to catch further animals. The animal traps of the above-referred-to Canadian Pat. Nos. 80,777 and 404,588 have to be reset if one wishes to catch more than one animal. The animal trap of U.S. Pat. No. 407,887 is said to be capable of catching animals one after another without danger of caged animals escaping when the trap is automatically reset.

Numerous other "live" animal traps are known, and are described in, for example, U.S. Pat. No. 114,062 of J. N. Stow et al., issued Apr. 25, 1871; U.S. Pat. No. 1,222,606 of J. T. Daniel, issued Apr. 17, 1917; U.S. Pat. No. 1,323,024 of G. W. Curtis, issued Nov. 25, 1919; U.S. Pat. No. 2,250,823 of James Conners, issued July 29, 1941 and U.S. Pat. No. 2,774,175 of E. L. Maddocks, issued Dec. 18, 1956; and Canadian Pat. Nos. 438,150 of George F. Fisher, issued Mar. 26, 1946 and 517,495 of Walter E. McKim, issued Oct. 18, 1955. There are certain disadvantages, however, with respect to prior art "live" animal trap constructions. In those constructions where one or more cage doors are employed, the cage doors must be quickly operative with a snap-action closing so as not to allow the animal time to escape. The triggering device or mechanism utilized must be fail-safe in operation and must be sensitive to movement by the animal. On the other hand, the triggering operation cannot be too sensitive; otherwise simple jarring of the trap could accidentally effect closing of the door, thus rendering the interior of the trap inaccessible to animals. Attempts to meet the above and other requirements of "live" animal traps, such as the easy and reliable setting of the trigger mechanism and/or resetting of the trap for more than one animal in succession, have generally resulted in traps of this type which are quite complex and prone to failure.

The primary object of this invention is to provide an automatic trap adapted to catch small animals alive and unharmed.

Another object of this invention is to provide an automatic small animal trap which operates without alerting or scaring off animals.

A further object of this invention is to provide an automatic small animal trap which is simple in construction and operation, and suitable for economical large-scale manufacture.

According to one aspect of this invention, there is provided a trap adapted to catch a small animal without killing or hurting the same, comprising an outer cage having incorporated therewith removal means whereby an animal trapped within said outer cage can be removed, an inner cage rotatably disposed within the outer cage about an axle extending between a pair of spaced, upstanding, oppositely-disposed walls of the outer cage and fixedly secured thereto, said trap having an outer opening in said outer cage and an inner opening in said inner cage, said inner cage being so disposed operatively relative to said outer cage, that when the trap is in operative position, the outer and inner openings are aligned, thereby permitting entry of a small animal into said inner cage through said aligned openings, treadle means pivotally and non-rotatably disposed within the inner cage on said axle, one end of said treadle means bearing against a smooth portion of the inner surface of a side wall of said inner cage, said treadle means at its lower, free end engaging a slot in the side wall of said inner cage and opposite to said inner opening, thereby locking the inner cage (in said operative position) when said trap is in its operative position, the free end of said treadle means being movable away from engagement with said slot when a small animal entering the inner cage contacts said treadle means, thereby releasing the treadle means and causing said inner cage to rotate relative to the outer cage, while allowing the free end of said treadle means to slidably contact the smooth portion of the inner surface of the side wall of said inner cage; at least one lug radially and outwardly extending from the periphery of either one of a pair of oppositely-disposed, vertical walls of the inner cage, a locking means operatively disposed within the outer cage and adapted to engage said lug, said lug being spaced from the slot a distance such that when said lug is engaged with the locking means the inner opening and outer opening of said trap are not aligned.

According to another aspect of this invention there is provided an automatic trap adapted to catch small animals without killing or hurting the same, comprising an outer cage having incorporated therewith removal means whereby animals trapped within said outer cage can be removed, an inner cage rotatably disposed within the outer cage about an axle extending between a pair of spaced, upstanding, oppositely-disposed walls of the outer cage and fixedly secured thereto, said trap having an outer opening in said outer cage and an inner opening in said inner cage, said inner cage being so disposed operatively relative to said outer cage, that when the trap is in operative position, the outer and inner openings are aligned, thereby permitting entry of a small animal into said inner cage through said aligned openings, a counterweight secured to the inner cage at a location opposite to the inner opening, said counterweight being heavy enough to ensure rotation of the inner cage to a position where said inner opening becomes aligned with said outer opening when said inner cage is free from external forces, but being light enough to allow free rotation of said inner cage by movement of a small animal when the latter is in the inner cage; treadle means pivotally and non-rotatably disposed within the inner cage on said axle, one end of said treadle means bearing against a smooth portion of the inner surface of a side wall of said inner cage, said treadle means at its lower, free end engaging a slot in the side wall of said inner cage and opposite to said inner opening, thereby locking the inner cage in place when said trap is in its operative position, the free end of said treadle means being movable away from engagement with said slot when a small animal entering the inner cage contacts said treadle means, thereby releasing the treadle means and causing said inner cage to rotate relative to the outer cage, while allowing the free end of said treadle means to slidably contact the smooth portion of the inner surface of the side wall of said inner cage; at least one lug radially and outwardly extending from the periphery of either one of a pair of oppositely-disposed, vertical walls of the inner cage, a locking means operatively disposed within the outer cage and adapted to engage said lug, said lug being spaced from the slot a distance such that when said lug is engaged with the locking means the inner opening and outer opening of said trap are not aligned, and the distance between the inner opening and the outer cage walls is sufficiently great to enable a small animal to escape from the inner cage into the outer cage through said inner opening, and said locking means having a treadle adapted to release the locking means from the lug when contacted by a small animal in the outer cage.

The advantages derived from the present invention are numerous. Small animals may be caught for pets or live specimens. The traps according to the present invention may be used to catch mice or rats without danger of injury to pets or people. The traps eliminate the need for poison in homes or food factories, thereby solving the possible danger of being mistakenly taken by infants or pets, or being mistakenly mixed with food products. The automatic traps of this invention do not require resetting as they are automatically reset in the operative position by animals caught by the traps. Because of the quiet operation of the traps, they do not alert or scare off succeeding animals. They require only occasional attention as trapped animals may be able to live for a long period of time if water and/or food are placed in the outer cage. Their operative sensitivity is sufficient to catch a baby mouse of less than three-eights of one ounce if the moving parts of the trap are made of light materials. The traps of this invention are simple in construction, and are suitable for low-cost, large-scale manufacture.

Other objects, aspects or advantages of this invention will be further envisaged by referring to the accompanying drawings of preferred embodiments of traps according to the present invention, wherein.

Figure 1:
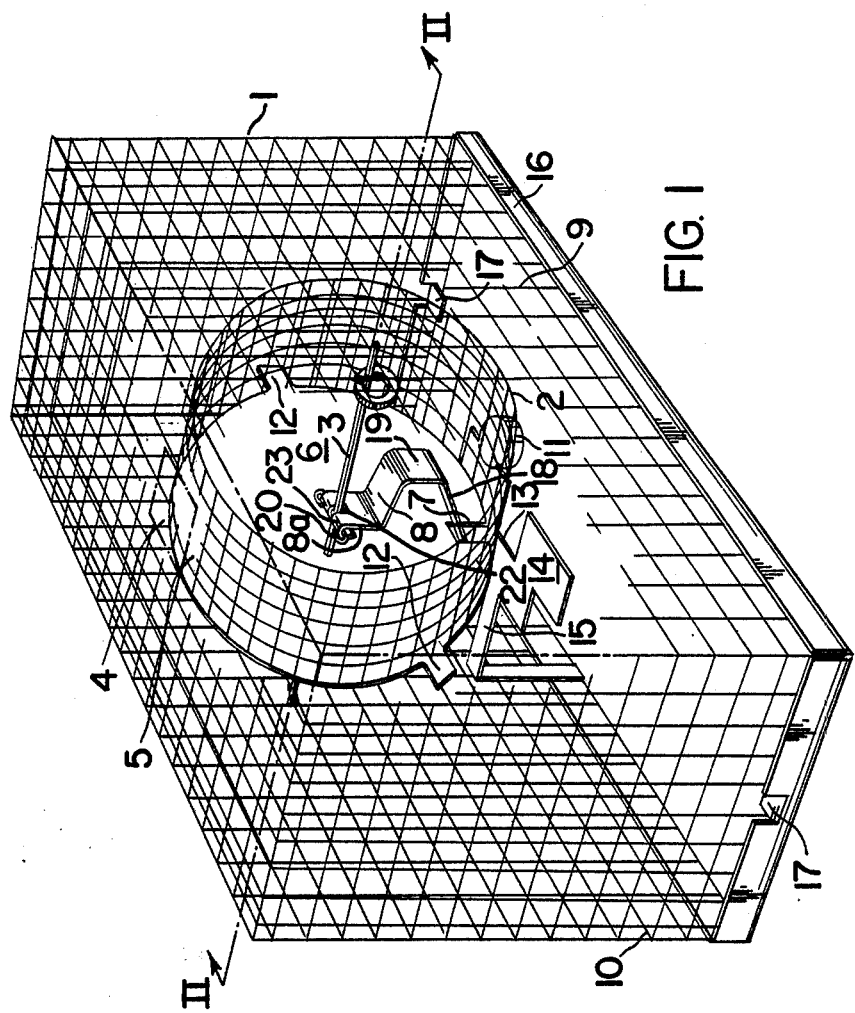
FIG. 1 is a partially broken-away perspective view of an automatic trap according to one embodiment of the present invention.
Figure 2:
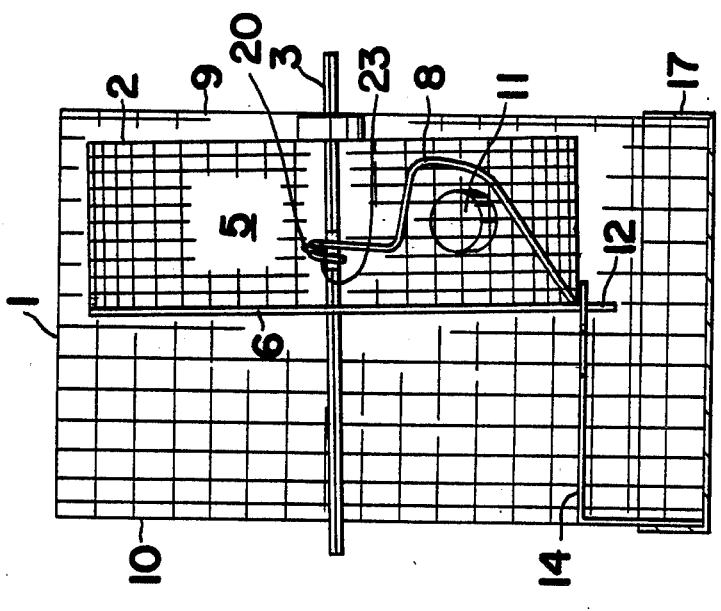
FIG. 2 is a side elevational view of the trap of FIG. 1, taken along the line II—II, in which a lug is engaged with the locking means.

Now referring to FIGS. 1 and 2, within a parallelopipedal outer cage 1 of rectangular cross-section, a drum-shaped inner cage 2 is rotatably disposed about an axle 3. Both cages are made from iron wire mesh, except for a bottom tray 16 of the outer cage 1 and a side wall 6 of the inner cage 2. The iron wire mesh may be replaced by plastic mesh or other metallic wire mesh having suitable strength. Alternatively, they may be made from plastic or metallic sheets of suitable strength. The sheets may be either opaque or transparent, and may be perforated. It is also possible to use any combination of the above materials for the cages. The axle 3 is fixedly secured to the upstanding, oppositely-disposed side walls 9, 10 of the parallelopipedal outer cage 1. A rectangular outer opening 4 and a matching rectangular inner opening 5 are respectively provided in the top wall of the outer cage 1 and in the peripheral wall of the drum-shaped inner cage 2. The outer opening 4 and inner opening 5 are aligned in operative position for permitting entry of a small animal such as a mouse or rat through the openings 4, 5. The side wall 6 of the inner cage 2 is made of sheet metal (or alternatively, of sheet plastic), and is provided with a slot 7 through which the free end of a treadle lever 8 outwardly extends to lock the inner cage 2 in operative position. The side wall 6 of the inner cage 2 must have sufficient smooth surface to facilitate sliding movement of the free end of the treadle lever during the rotation of the inner cage 2. The side wall 6 may be made from plastic mesh or metallic wire mesh if a smooth web is attached onto the inner surface of the side wall at a portion of the surface which will be slidably contacted with the free end of the treadle lever 8 during rotatory movement of the inner cage 2. The treadle lever 8 is pivotally suspended from the axle 3 such that the free end of the treadle lever 8 is continuously bearing against the inner surface of the smooth side wall 6 of the inner cage 2 when the trap is not in operative position.

Treadle lever 8, as illustrated in FIG. 1, has a relatively short straight portion 8a extending downwardly from its point of attachment to axle 3, and integrally merging with a bent portion resembling somewhat, in profile, a truncated U, with the leg thereof sloping downwardly at an obtuse angle relative to straight portion 8a. The actual configuration of the treadle lever 8, however, is not critical as long as one downwardly projecting portion is of sufficient length that the end thereof bears against the inner surface of side wall 6 when the trap is not in operative position, and can project outwardly through slot 7 when the trap is in operative position. For instance, alternatively, treadle lever 8 can have an approximately sickle-shaped (falciform) configuration in profile.

It is preferable to reduce the spacing between the downwardly-sloping end portion 18 of the treadle lever 8 and the inner cage 2 to less than the normal height of a small animal of the type for which the trap of this invention is designed, to prevent the animal from passing between the downwardly-sloping end portion 18 and the inner cage 2.

Figure 4:
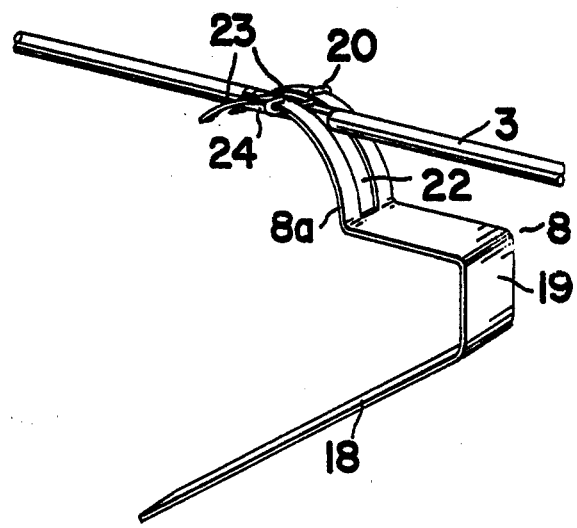
FIG. 4 is a partial perspective view of the automatic trap as in FIG. 1, 2 or 3, showing installation of the treadle lever in detail. The folded-over upper terminal portion of the treadle lever is shown enlarged and in exaggerated detail, for purposes of clarity.
Figure 5:
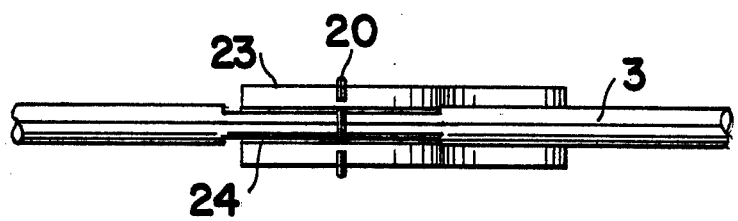
FIG. 5 is a top plan view of the installation of the treadle lever in FIG. 4.

As seen in the drawings, particularly in FIGS. 4 and 5, the treadle lever 8 at its upper extremity, where it is secured to axle 3, terminates in a folded-over portion 23, said portion 23 having the configuration of an inverted U, and being provided with a central, longitudinally-extending slot 22 (see FIGS. 1, 4 and 5), through which a vertically-bevelled, flat portion 24 of the axle 3 extends, said bevelled flat portion 24 being the central portion of the axle, disposed within inner cage 2. The downward bends of the folded-over portion 23 of the treadle lever 8 extend beyond the axle 3 and slidably envelop the vertically-bevelled, flat portion 24 of the axle 3 therebetween. Slot 22 has a width slightly greater than the width of the vertically-bevelled, central portion of the axle. The treadle lever 8 is pivotally secured to the axle 3 by means of a fastening rod 20, which may assume the form of a wire or slender flexible rod, passing between axle 3, at its central portion, and the apex of U-shaped portion 23 of the treadle lever 8, transversely of the axle, and the ends of which are bent inwardly around the sides of and over the top of U-shaped portion 23 of the treadle lever 8. This installation allows the treadle lever 8 to swing forward or backward relative to the side wall 6 of the inner cage 2 as the vertically-bevelled, flat portion 24 of the axle 3 is slidably held in the slot 22 in the treadle lever 8. No rotation of the treadle lever 8 about the axle 3 is permitted.

The inner cage 2 is provided with a counterweight 11 on the outer surface of the peripheral wall of the inner cage 2, opposite to the inner opening 5. The side wall 6 is provided with a pair of spaced lugs 12, 12 extending radially and outwardly from the circumferential periphery of the side wall 6. The lugs 12, 12 engage a locking slot 13 provided in an approximately L-shaped locking means 14, which is fixedly secured to the upright wall 10 of the outer cage 1 and projects inwardly toward the bottom of inner cage 2. The free end of the locking means 14 is downwardly movable when the horizontal treadle 15 is depressed by an animal such as a mouse. A similar locking means without the upright portion may be employable provided that the proximal end of the treadle 15 is fixedly secured to the side wall 10 of the outer cage 1 in any suitable manner. The bottom tray 16 is detachably secured to the outer cage 1 by means of a pair of holding lugs 17, 17 extending inwardly from the upstanding, oppositely-disposed end walls of the tray.

Figure 3:
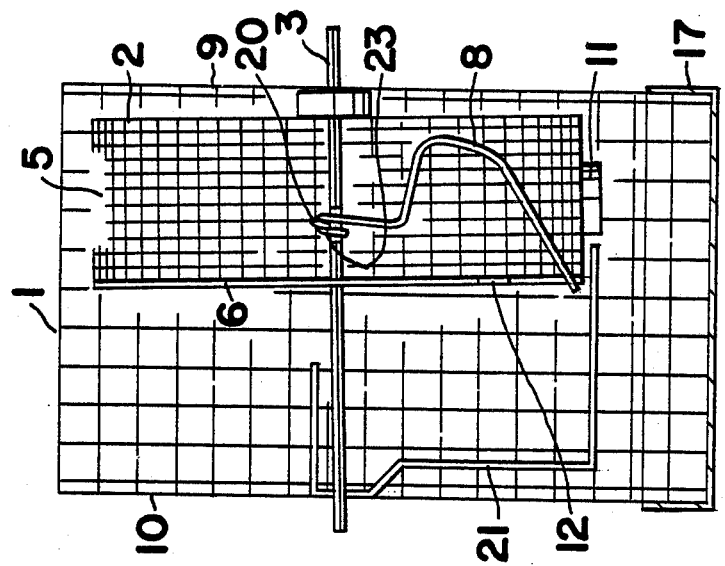
FIG. 3 is a side elevational view of an automatic trap according to another embodiment of the present invention in which a locking means extends downwardly from an axle.

In FIG. 3, a locking means 21 is suspended from the axle 3. The other parts of the automatic trap are identical to those of the automatic trap of FIGS. 1 and 2.

The operation of the above-described automatic traps is illustrated below. Referring to FIGS. 1 and 2, a small animal such as a mouse or rat enters the inner cage 2 through the outer and inner openings 4 and 5, by being attracted by bait placed in the inner cage 2. The bait must be light enough to allow free rotation of the inner cage 2 about the axle 3 by movement of the small animal within the inner cage 2. Bait can be placed in either or both cages. A large quantity of bait can be placed in the outer cage for less frequent attention. The small animal, either when it steps upon the downwardly-sloping end portion 18 of the treadle lever 8 or when it passes through the spacing between the side wall 6 and the treadle lever 8, thereby pushing the treadle lever 8 away from the side wall 6, causes the free end of the treadle lever to move away from the slot 7 by a swinging action, thereby releasing the inner cage 2 from its locked position, which is, in other words, the operative position of the trap. Depending upon the moving direction of the animal, the inner cage 2 rotates in either one of the rotatory directions. When the lug 12 moves downwardly as far as the locking slot 13 of the locking means 14, the inner cage 2 is in the locked position, in which the inner opening 5 and the outer opening 4 are no longer aligned, so that the animal can no longer escape from the trap through the openings 4 and 5. The lugs 12, 12 are respectively spaced from the slot 13 of the locking means 14 a distance such that when engaged with the locking means the distance between the inner opening 5 and the top wall of the outer cage 1 is sufficiently great to permit the small animal to escape from the inner cage 2 into the outer cage 1 through the inner opening 5.

Some small animals, particularly mice, are known to use their long tails as anchors, "to keep one foot on the ground", so to speak. The trap of the present invention is designed to take into account this fact. Before reaching the bait placed in the inner cage 2, or before actuating the treadle lever, such small animals must proceed all the way into the inner cage 2, opposite to the opening 5. The treadle lever 8 is not actuated until the small animal, including its tail, is entirely within the inner cage 2. The mouse (or other small animal), having entered the inner cage in an effort to get at the bait, is caused to go around and below the part of the treadle lever closest the cage entrance before reaching the bait before the treadle lever 8 is actuated. The small animal may make contact with the upper portion of the treadle lever, and even lodge thereon, on first entering the inner cage, without causing premature operation of the trap. The design of this trap is such, therefore, that a small animal entering the inner cage is prevented from escaping therefrom backwards, or from catching its tail between the outer cage 1 and the inner cage 2.

The animal, in seeking to escape, then moves out from the inner cage 2 into the outer cage 1 through the inner opening 5 (best shown in FIG. 2). When the animal in the outer cage 1 depresses the treadle 15 of the locking means 14, the lug 12 is released from the locking slot 13 of the locking means 14. Because of the counterweight 11, the inner cage 2 rotates to the operative position. During the rotation of the inner cage 2, the free end of the treadle lever 8 is bearing against the side wall 6 of the inner cage 2 and finally enters the slot 7 of the side wall 6, thereby completing the resetting operation of the trap for another small animal. By repeating this operation, it is possible to catch any desired number of small animals alive and unharmed. If water and food are placed in the outer cage 1, small animals caught by the trap may be able to survive for a long period of time. As obviously envisaged from the above description, the counterweight 11 must be heavy enough to ensure rotation of the inner cage 2 to operative position when the inner cage 2 is free from external forces, but it must be light enough to allow free rotation of the inner cage 2 by movement of a small animal in the inner cage. It is also possible to employ such a trap as in FIGS. 1 and 2 without the counterweight 11 and the treadle 15 for catching a single small animal.

The present invention has been described hereinabove in some detail, with reference to certain preferred embodiments as illustrated in the drawings. It is to be understood, however, that the invention is not to be limited to these specific embodiments. Various modifications and variations in the construction of the trap will no doubt suggest themselves to persons skilled in the art. Such modifications could be made, for instance, in the material or materials from which the trap and/or individual components thereof is (are) made; in the size of the trap; or in the positioning of the inner cage with respect to the outer cage, etc., dictated by such factors as the type of animal one desires to trap alive and unharmed, for instance; without departing from my basic inventive principle. It is therefore desired that this invention be limited only by the claims which follow.

What I claim is:

1. A trap adapted to catch a small animal without killing or hurting the same, comprising an outer cage having incorporated therewith removal means whereby an animal trapped within said outer cage can be removed, an inner cage rotatably disposed within the outer cage about an axle extending between a pair of spaced, upstanding, oppositely-disposed walls of the outer cage and fixedly secured thereto, said trap having an outer opening in said outer cage and an inner opening in said inner cage, said inner cage being so disposed operatively relative to said outer cage that when the trap is in operative position the outer and inner openings are aligned, thereby permitting entry of a small animal into said inner cage through said aligned openings, treadle means pivotally and non-rotatably disposed within the inner cage on said axle, one end of said treadle means bearing against a smooth portion of the inner surface of a side wall of said inner cage, said treadle means at its lower free end engaging a slot in the side wall of said inner cage and opposite to said inner opening, thereby locking the inner cage (in said operative position) when said trap is in its operative position, the free end of said treadle means being movable away from engagement with said slot when a small animal entering the inner cage contacts said treadle means, thereby releasing the treadle means and causing said inner cage to rotate relative to the outer cage, while allowing the free end of said treadle means to slidably contact the smooth portion of the inner surface of one side wall of said inner cage; at least one lug radially and outwardly extending from the periphery of either one of a pair of oppositely-disposed, vertical walls of the inner cage, a locking means operatively disposed within the outer cage and adapted to engage said lug, said lug being spaced from the slot a distance such that when said lug is engaged with the locking means the inner opening and outer opening of said trap are not aligned.

2. The trap as in claim 1 wherein said treadle means is a treadle lever.

3. The trap as in claim 1 wherein said outer cage is parallelopipedal and of rectangular cross-section, said inner cage is drum-shaped and said outer opening is provided in the top wall of the right-angled parallelopipedal outer cage.

4. The trap as in claim 1 wherein one wall of said inner cage is provided with a pair of spaced lugs radially and outwardly extending from the periphery of said one wall at positions along said periphery equidistantly spaced from the sides of said slot, said lugs being spaced from the slot a distance such that when either of said lugs is engaged with the locking means the inner opening and the outer opening of the trap are not aligned.

5. The trap as in claim 1 wherein said axle is vertically bevelled along its central portion disposed within said inner cage, thereby forming a pair of flat side walls on the axle; said treadle means is bent at the upper extremity thereof into an inverted U-shape, and said bent portion is provided with a central, longitudinally-extending slot having a width slightly greater than the width of the bevelled central portion of the axle; said vertically-bevelled portion of the axle extending through the slot in said U-shaped portion of the treadle means, and said treadle means being pivotally secured to the vertically-bevelled portion of the axle by means of a fastening rod transversely extending through the spacing formed between the upper surface of the vertically-bevelled portion of the axle and the lower surface of the inverted U-shaped upper extremity of the treadle means, thereby allowing forward or backward swinging motion of the treadle means relative to the wall of the inner cage.

6. The trap as in claim 1 wherein one side wall of said inner cage is made from a metallic or plastic sheet.

7. The trap as in claim 1 wherein said lug is spaced from the slot a distance such that when engaged with the locking means the inner opening and the outer opening are not aligned and the distance between the inner opening and the outer cage is sufficiently great to permit the small animal to escape from the inner cage into the outer cage through said inner opening.

8. The trap as in claim 3 wherein said removal means is a detachably-arranged bottom wall of said right-angled parallelopipedal outer cage.

9. An automatic trap adapted to catch small animals without killing or hurting the same, comprising an outer cage having incorporated therewith removal means whereby animals trapped within said outer cage can be removed, an inner cage rotatably disposed within the outer cage about an axle extending between a pair of spaced, upstanding, oppositely-disposed walls of the outer cage and fixedly secured thereto, said trap having an outer opening in said outer cage and an inner opening in said inner cage, said inner cage being so disposed operatively relative to said outer cage that when the trap is in operative position, the outer and inner openings are aligned, thereby permitting entry of a small animal into said inner cage through said aligned openings, a counterweight secured to the inner cage at a location opposite to the inner opening, said counterweight being heavy enough to ensure rotation of the inner cage to a position where said inner opening becomes aligned with said outer opening when said inner cage is free from external forces, but being light enough to allow free rotation of said inner cage by movement of a small animal when the latter is in the inner cage; treadle means pivotally and non-rotatably disposed within the inner cage on said axle, one end of said treadle means bearing against a smooth portion of the inner surface of a side wall of said inner cage, said treadle means at its lower free end engaging a slot in the side wall of said inner cage and opposite to said inner opening, thereby locking the inner cage in place when said trap is in its operative position, the free end of said treadle means being movable away from engagement with said slot when a small animal entering the inner cage contacts said treadle means, thereby releasing the treadle means and causing said inner cage to rotate relative to the outer cage, while allowing the free end of said treadle means to slidably contact the smooth portion of the inner surface of the side wall of said inner cage; at least one lug radially and outwardly extending from the periphery of either one of a pair of oppositely-disposed, vertical walls of the inner cage, a locking means operatively disposed within the outer cage and adapted to engage said lug, said lug being spaced from the slot a distance such that when said lug is engaged with the locking means the inner opening and outer opening of said trap are not aligned, and the distance between the inner opening and the outer cage walls is sufficiently great to enable a small animal to escape from the inner cage into the outer cage through said inner opening, and said locking means having a treadle adapted to release the locking means from the lug when contacted by a small animal in the outer cage.

10. An automatic trap as in claim 9 wherein said treadle means is a treadle lever.

11. An automatic trap as in claim 9 wherein said outer cage is parallelopipedal and of rectangular cross-section, said inner cage is drum-shaped and said outer opening is provided in the top wall of the right-angled parallelopipedal outer cage.

12. An automatic trap as in claim 9 wherein one wall of said inner cage is provided with a pair of spaced lugs radially and outwardly extending from the periphery of said one wall at positions along said periphery equidistantly spaced from the sides of said slot, said lugs being spaced from the slot a distance such that when either of said lugs is engaged with the locking means the inner opening and the outer opening of the trap are not aligned.

13. The trap as in claim 9 wherein said axle is vertically bevelled along its central portion disposed within said inner cage, thereby forming a pair of flat side walls on the axle; said treadle means is bent at the upper extremity thereof into an inverted U-shape, and said bent portion is provided with a central, longitudinally-extending slot having a width slightly greater than the width of the bevelled central portion of the axle; said vertically-bevelled portion of the axle extending through the slot in said U-shaped portion of the treadle means, and said treadle means being pivotally secured to the vertically-bevelled portion of the axle by means of a fastening rod transversely extending through the spacing formed between the upper surface of the vertically-bevelled portion of the axle and the lower surface of the inverted U-shaped upper extremity of the treadle means, thereby allowing forward or backward swinging motion of the treadle means relative to the wall of the inner cage.

14. The trap as in claim 9 wherein one side wall of said inner cage is made from a metallic or plastic sheet.

15. An automatic trap as in claim 11 wherein said removal means is a detachably-arranged bottom wall of said right-angled, parallelopipedal outer cage.

16. An automatic trap as in claim 9 wherein said locking means extends from one of the pair of upstanding, oppositely-disposed walls of the outer cage, said upstanding wall being adjacent to said one of the vertical walls of the inner cage to which vertical wall at least one lug is attached.

17. An automatic trap as in claim 9 wherein said locking means extends downwardly from the axle between one of the pair of upstanding, oppositely-disposed walls of the outer cage and said one of the vertical walls of the inner cage to which vertical wall at least one lug is attached.

18. An automatic trap as in claim 9 wherein said one of the vertical walls of the inner cage, to which vertical wall at least one lug is attached, is smooth at at least the inner surface of said wall so that the free end of said treadle means does not reduce the rotation of the inner cage about the axle caused by movement of a small animal in the inner cage.

19. The automatic trap as in claim 9 wherein said outer cage and inner cage are formed of metallic wire mesh, plastic mesh or combinations thereof, and the smooth portion of the inner surface of one side wall of said inner cage is formed of a metallic or plastic sheet attached onto said inner surface of the side wall of said inner cage.

20. The automatic trap as in claim 14 wherein said outer cage and the rest of said inner cage are formed of metallic wire mesh, plastic mesh or combinations thereof.

21. The automatic trap as in claim 15 wherein said detachably-arranged bottom wall is a tray made of a metallic or plastic material, said tray having at least one lug extending inwardly from each of a pair of oppositely-disposed raised portions.

* * * * *